United States Patent
Kortenbach et al.

(10) Patent No.: US 6,302,980 B1
(45) Date of Patent: Oct. 16, 2001

(54) METHOD FOR FORMING A WATER-TIGHT SECTION IN A PREDETERMINED AREA OF A MULTI-CONDUCTOR WIRING SYSTEM

(75) Inventors: Martin Kortenbach, St. Augustin; Christoph Von Pupka, Hennef; Helmut Arenz, Alfter; Michael Krusenbaum, Swistal; Thomas Heim, Brühl, all of (DE)

(73) Assignee: DSG Schrumpfschlauch GmbH, Meckenheim (DE)

( * ) Notice: Subject to any disclaimer, the term of this patent is extended or adjusted under 35 U.S.C. 154(b) by 0 days.

(21) Appl. No.: 09/339,542

(22) Filed: Jun. 24, 1999

Related U.S. Application Data

(63) Continuation-in-part of application No. 08/836,947, filed as application No. PCT/EP95/04610 on Nov. 22, 1995, now abandoned.

(51) Int. Cl.$^7$ .................................................. H01B 13/06
(52) U.S. Cl. ................... 156/48; 156/55; 156/86; 156/227; 156/308.2; 156/53
(58) Field of Search ................... 156/48, 51–53, 156/55–56, 84–86, 166, 227, 228, 308.2; 174/76, 77 R, 84 R, DIG. 8

(56) References Cited

U.S. PATENT DOCUMENTS

| | | | |
|---|---|---|---|
| 4,863,535 | * | 9/1989 | More ..................................... 156/49 |
| 4,997,689 | * | 3/1991 | Langen et al. ......................... 156/52 |
| 5,342,997 | * | 8/1994 | Kanno et al. .......................... 156/51 |
| 5,378,879 | * | 1/1995 | Monovoukas ........................ 219/634 |

* cited by examiner

Primary Examiner—Michael W. Ball
Assistant Examiner—John T. Haran
(74) Attorney, Agent, or Firm—Scully, Scott, Murphy & Presser

(57) ABSTRACT

A method for forming a longitudinally water-tight section in a predetermined area of a multi-conductor wiring system. The multi-conductor wiring system has a plurality of individual conductors, each individual conductor being encased in an insulative sheath. The method includes the steps of: providing an adherent tape having a single sealing compound for adhering the individual conductors thereto and for sealing spaces between the individual conductors when exposed to a softening temperature less than the softening temperature of the insulative sheathes of the individual conductors; arranging the individual conductors parallel to one another in a direction transverse to the adherent tape in the predetermined area on a first end of the adherent tape; folding a second end of said adherent tape onto the conductors such that the individual conductors are sandwiched therebetween; pressing the first and second ends of the adherent tape together to sealingly fill the spaces between the conductors; heating the sealing compound to the softening temperature of the sealing compound; and applying an outer envelope over the sealed predetermined area. In a variation of the method of the present invention, the method further includes the step of compressing the sealing compound at an elevated pressure while being heated to the softening temperature such that pores, voids and gases in the sealing compound are substantially removed.

7 Claims, 12 Drawing Sheets

METHOD FOR FORMING A WATER-TIGHT SECTION IN A PREDETERMINED AREA OF A MULTI-CONDUCTOR WIRING SYSTEM

CROSS REFERENCE TO RELATED APPLICATIONS

This application is a continuation-in-part of U.S. Application No. 08/836,947, filed May 21, 1997, now abandoned, which is a 371 of PCT/EP95/04610 filed on Nov. 22, 1995.

BACKGROUND OF THE INVENTION

In the field of automotive engineering, for example, wiring systems are frequently used in the form of loose bunches of conductors which are not provided with an outer cable sheath. Such wiring systems can comprise a large number of conductors which have different dimensions and which must be installed in the vehicle. For simplifying such wiring systems and for arranging them in a clearer mode of arrangement, their conductors (lines), which may be routed over prolonged distances up to the connection point, are bundled so as to form a cable harness. Such a cable harness is normally formed by combining on a nail board, a plurality of conductors which have been cut to their respective required longitudinal dimensions and by binding said conductors together by cable belts or plastic bands, whereupon they are secured by means of clamps to the chassis or to another part of the vehicle.

If such a cable harness is guided through partition panels, e.g. from the engine compartment of a passenger car into the car interior, there is the risk that moisture, such as condensation water or splash, creeps along the surfaces of the conductors or on the surfaces of bunches of conductors and reaches bare electric wires at the conductor ends and enters e.g. into the attachment plugs of the electronic system of an engine where they may cause short circuits and, consequently, severe failures.

DE 36 31 769 Al discloses that, for forming a longitudinally water-tight section in a predetermined area of a multi-conductor wiring system, such as a cable harness, the spaces (interstices) between the individual conductors are filled with a plastic material in the predetermined area to be sealed, whereupon a shrinkable hose is pushed onto the outer circumference of the wiring system in the area of the section to be sealed and caused to shrink closely onto the circumference of said wiring system by the supply of heat. The filling of the spaces (interstices) between the individual conductors as well as between the inner surface of the shrinkable hose and the outer conductors of the wiring system is carried out by embedding an element of plastic material between the conductors before the shrinkable hose is pushed on; said element of plastic material swells up in the course of the heat treatment so that its cross-sectional shape is enlarged and it consists of or includes a thermoplastic hot-melt adhesive which, when heated, melts, foams and, in so doing, forms closed pores.

U.S. Pat. No. 4,997,689 to Langen, et al. ("Langen") discloses a "dual strip" method for sealing multiple-strand cable bundles in a longitudinally watertight manner. Langen is referred to as a "dual strip" method because it comprises a sealing strip having two adhesive components, a melt adhesive forming the bulk of the adhesive components and butyl rubber in a much less amount than the melt adhesive component. In addition to the two adhesive components, the sealing strip has a non-sticky release paper layer. The melt adhesive of Langen is a plastic material which after heating to about 130° C. will melt, thereby forming a sticky melt. Thus, the melt adhesive is a polymer having a relatively high melting point which provides the required sealing effect as it penetrates in its molten state into voids existing between neighboring conductors and between conductors and a surrounding shrinkable hose. The Butyl rubber component does not play a role in the sealing effect as it is merely present in a much smaller amount than the melt adhesive and is mainly used to allow the temporary fixing of the cable strands in a side by side relation before the addition of heat. Thus, the Butyl rubber component is used as a positioning aid which keeps the cable strands in the side by side orientation during subsequent winding or folding and heating.

After winding or folding the cable strands and before the heating of the melt adhesive, an outer heat shrinkable hose is applied around the portion to be sealed. Thus, the application of heat not only melts the melt adhesive but effects the shrinking of the heat shrinkable hose, thus exerting a nominal compressive force onto the cable bundle.

While the method of Langen has its advantages, the high temperatures needed to melt the melt adhesive are apt to cause damage to the insulative sheaths provided around each of the conductors comprising the cable bundle. At temperatures of 130° C., many plastic insulative sheathes are softened or melted thereby provoking the risk of unacceptable electric shorts within the cable bundle. Additionally, the outer shrinkable hose must be selected that can withstand the required high temperatures without damage and which can reliably shrink at the required high temperatures. Lastly, the pressure supplied by the outer shrinkable hose on the cable bundle is relatively weak, approximately 30N measured over a length of 30 mm. This weak compressive force is not enough to effectively force the melt adhesive into all voids existing between neighboring cable strands, nor will it effectively squeeze all voids and pores existing in the melt adhesive itself.

In fact, the methods of Langen have failed to meet the specification of European automobile manufacturers to provide 100% longitudinal water tightness within a conductor bundle for a useful life of at least 3000 hours at temperatures of 105° C. (which may occur in the engine compartment of today's automobiles).

Persons skilled in the art also know that longitudinally water-tight sections in wiring systems, such as cable harnesses, can be produced by filling the spaces (interstices) with the aid of molten casting resins, by enveloping the conductors by means of injection molding, by kneading-in sealing compounds, or by embedding the conductors in a gel.

All these courses of action known in the prior art have the following disadvantages in common:
   lack of reproducibility;
   long processing times;
   complicated handling;
   the risk that the electric conductors or other electric/electronic components may be thermally damaged because of the high temperatures required;
   high total-costs; and
   in some cases, substantial enlargement of the sealing point as well as the necessity of at least one additional phase of operation while mounting (e.g. a cable harness).

SUMMARY OF THE INVENTION

It is the object of the present invention to improve the formation of longitudinally water-tight sections in multiconductor wiring systems in comparison with that known in the prior art in such a way that a less complicated mounting of the necessary components is guaranteed in combination with a substantial saving of time and high reproducibility, without causing any substantial enlargement of the dimensions (i.e. especially the outer diameter of the sealing point of the bunched cable), and without damaging the insulative sheaths of the conductors within the cable bunch due to high processing temperatures.

It is a further object of the present invention to provide a method for forming a water-tight section in a predetermined section of a multi-conductor wiring system in which all pores and voids contained within a sealing compound used to seal the individual conductors in the multi-conductor system are removed from the sealing compound.

It is a yet another object of the present invention to provide a method for forming a water-tight section in a predetermined section of a multi-conductor wiring system wherein water creeping along individual conductors or bunches of conductors is to be prevented from passing the sealing point.

It is a still yet another object of the present invention to provide a method for forming a water-tight section in a predetermined section of a multi-conductor wiring system which complies 100% with the aforementioned European automobile manufacturers specification for such wiring systems.

Accordingly, a method for forming a longitudinally water-tight section in a predetermined area of a multi-conductor wiring system is provided. The multi-conductor wiring system has a plurality of individual conductors, each individual conductor being encased in an insulative sheath. The method comprises the steps of: providing an adherent tape having a single sealing compound for adhering the individual conductors thereto and for sealing spaces between the individual conductors when exposed to a softening temperature less than the softening temperature of the insulative sheathes of the individual conductors; arranging the individual conductors parallel to one another in a direction transverse to the adherent tape in the predetermined area on a first end of the adherent tape; folding a second end of said adherent tape onto the conductors such that the individual conductors are sandwiched therebetween; pressing the first and second ends of the adherent tape together to sealingly fill the spaces between the conductors; heating the sealing compound to the softening temperature of the sealing compound; and applying an outer envelope over the sealed predetermined area.

In a preferred variation of the method of the present invention, the method further comprises the step of compressing the sealing compound at an elevated pressure while being heated to the softening temperature such that pores, voids and gases in the sealing compound are substantially removed.

BRIEF DESCRIPTION OF THE DRAWINGS

These and other features, aspects, and advantages of the methods of the present invention will become better understood with regard to the following description, appended claims, and accompanying drawings where:

DETAILED DESCRIPTION OF THE PREFERRED EMBODIMENTS

Figure 1:
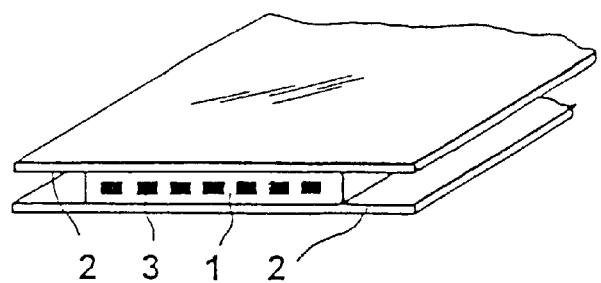
FIG. 1 shows a schematic, perspective representation of an adherent tape.

FIG. 1 shows schematically the structural design of an adherent tape 10 which is essential to the present invention. This adherent tape 10 consists of a central adhesive layer 1 and of upper and lower cover layers 2 between which the adhesive layer 1 is arranged in a sandwich like mode of arrangement. A fabric 3 extends through the adhesive tape 1, said fabric 3 being preferably arranged in the central plane of the adhesive layer 1 and having essentially the same length and width as the adhesive layer 1. With the exception of the fabric layer 3, the adhesive layer 1 preferably consists of butyl rubber in a modified form which can be vulcanized by heat input. The modification of the butyl rubber can be carried out such that the vulcanization takes place within a period of up to eight days, for example.

The butyl rubber can be replaced fully or partly by bitumen, silicone, partially cross-linked polymers and isobutane.

The fabric 3 can be a textile fabric or a metal fabric. Also textile fabrics reinforced by metal can be used. Specially preferred fabrics are metal fabrics which warm when current flows through them, as will be described in detail hereinbelow.

The adherent tape 10 has preferably a width of from 10 to 20 mm and a thickness of from 0.5 to 1.5 mm. The tape 10 can be processed in predetermined fixed lengths, from a supply roll, or as a continuous tape.

The adhesive material of layer 1 is intended to be used as a sealing compound, and, consequently, it must be of such a nature that, in response to the pressing power applied, it can flow into the spaces (interstices) between neighboring conductors so as to fill these spaces. Particularly important is the filling of interstices which are formed between three conductors or groups of conductors that are in mutual contact with one another.

After the final pressing, the sealing compound must guarantee a sufficiently strong adhesive-bonded joint so that the conductors (lines) embedded in the sealing compound cannot be displaced in the direction of their longitudinal axes. Furthermore, the material of the adhesive layer must be of such a nature that, when the pressing operation has been carried out or rather when the sealing point has been finished, it will cross-link due to heat input or after a sufficiently long storage time, depending on the demands to be fulfilled. The pressure tightness of the sealing point must be at least 0.5 bar at room temperature. During assembly it must be guaranteed that the conductors are stably fixed at their predetermined positions, and this stable fixing must be guaranteed in the case of all combinations of material used.

In addition, the adhesive material of layer 1 must be adapted to be subjected to cold welding, (i.e., a property of the adhesive layer material to flow into a homogeneous mass without requiring the elevated temperatures of the prior art) and it must have a temperature stability of at least 85° C. and a processing temperature at which it softens of approximately 60° C.

Low processing temperatures of approximately 60° C. are possible since the method of the present invention uses an adhesive strip having a single adhesive component (adhesive layer 1), namely a component which has good adhesive properties at ambient temperatures. Preferably, the adhesive material of layer 1 is Butyl rubber. Butyl rubber is extremely sticky at room temperature and furthermore softens at approximately 60° C. At such temperatures, damage to the insulative sheaths of individual conductors are avoided. Furthermore, Butyl rubber withstands the migration of softeners which tend to be released from the insulative sheathes of the conductors. Materials other than Butyl rubber are impaired by the entry of such chemical softening materials which are released from the insulative sheaths.

The upper and the lower cover layers 2 of the adherent tape 10 consist preferably of silicone-coated paper. Said cover layers 2 laterally project beyond the adhesive layer 1 by approximately 1 to 3 mm on both sides of said adhesive layer 1. These projecting portions on both sides serve to prevent the extremely tacky material of layer 1 from coming into contact with other parts, especially during transport. For protecting the adhesive material 1 against contact, with other objects, the outer edges of the projecting cover layers 2 can be adhesively interconnected so that the adhesive layer 1 will be protected along its two long outer edges in this case.

The upper and lower cover layers 2 receiving between them the adhesive material 1 can also consist of suitable plastic foils instead of silicone-coated paper. For this purpose, it is also possible to use net foils, which need not be removed prior to further processing.

With the aid of the fabric insert 3 arranged in the interior of the adhesive layer 1, the sealing point can be influenced. It is, for example, possible to influence the flowability of the sealing compound during processing, and the pressure load acting on the sealing point after said processing can be chosen in accordance with the load-bearing capacity of the fabric insert 3. Furthermore, the presence of said fabric insert 3 results in a stabilization of the adherent tape 10 during processing, e.g. when the adherent tape 10 is being processed from a supply roll. Depending on the material used for the sealing compound, the flowability of this compound can be adjusted in accordance with the temperature chosen.

If a metal fabric, e.g. a fabric consisting of copper filaments or cupriferous filaments, is used for the fabric insert 3, a uniform increase in temperature within the adherent tape 10 can be achieved within a very-short time e.g. by inductive heating of the metal fabric. Such a purposeful increase in temperature can be used for controlling the flow behavior of the adhesive layer 1 as desired.

Figure 2:
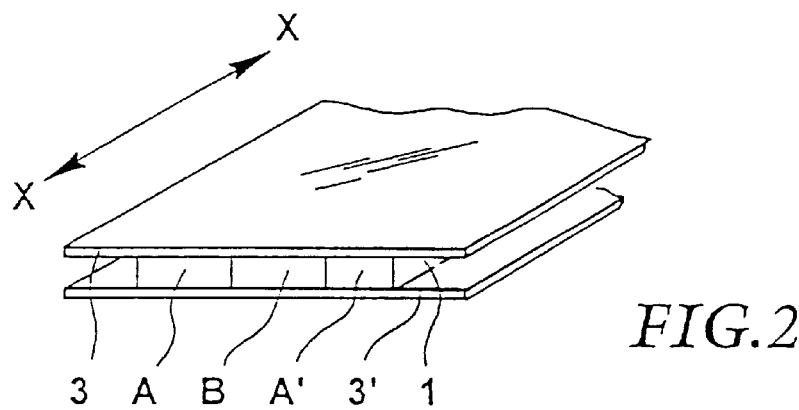
FIG. 2 shows a schematic, perspective representation of another-adherent tape.

A further embodiment of the adherent tape is shown in FIG. 2. In this case, the adhesive layer 1 is composed of three interconnected strips (A, B, A') which extend parallel to one another and parallel to the longitudinal direction of the tape. (X—X). The two outer strips A and A' consist of an adhesive material, preferably of polyisobutylene containing a certain percentage of isoprene; the degree of adhesiveness can be adjusted by choosing a suitable percentage of isoprene. The central strip B of the adhesive layer 1 consists of a cross-linked polymer. Preferably, the central strip B consists of a fully or partly vulcanized butyl rubber.

The adhesive layer 1 has a width of preferably 15 mm and a thickness of preferably 1 mm. The three-strip adhesive tape 1 can be produced by tri-extrusion of its strips A, B and A' and it can be processed from a continuous supply roll or by making use of sections which have been cut off to a desired length. At present, sections which have been cut off to a length of 50 mm are preferably used.

The cross-linking of the central strip B is caused by adding suitable cross-linking aids (reactive components) to the starting material.

In order to obtain the desired degree of cross-linking of the central strip B, the extrusion process is followed by a heat treatment; when this heat treatment has been finished, the aimed-at degree of cross-linking exists in said central strip B. It goes without saying that the two marginal strips A and A', which consist or which may consist of the same material, may also be cross-linked at least to a minor degree. It is of decisive importance that the two marginal strips A and A' have an intensive adhesiveness and that the central strip B has, due to its degree of cross-linking, a sufficiently high strength and resistance against chemical and mechanical attacks.

In spite of its cross-linking, the central strip B has at least a certain degree of adhesiveness.

In accordance with another solution, the central strip B, instead of consisting of a fully or partly vulcanized butyl rubber, can also be produced from a mixture consisting, on the one hand, of polyisobutylene containing a certain percentage of isoprene and, on the other hand, of cross-linkable polymers (e.g. butyl rubber).

Figure 3:
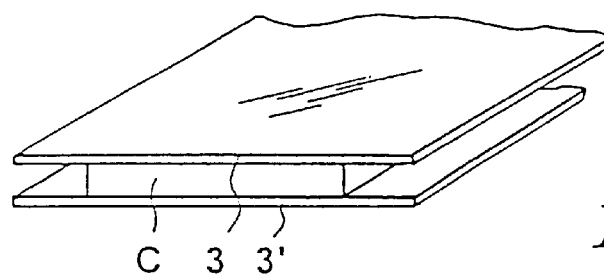
FIG. 3 shows a schematic, perspective representation of still another adherent tape.

According to a further embodiment of the type shown in FIG. 3 the adherent tape does not consist of three strips, but of a tape having the same dimensions, the whole area of said tape being, however, formed by one strip C. For increasing the resistance of the strip against chemical and mechanical attacks, said strip can consist of a mixture consisting, on the one hand, of polyisobutylene containing a certain percentage of isoprene and, on the other hand, of cross-linkable polymers (e.g. butyl rubber). In accordance with another variant where the tape also consists of a strip C, the whole strip is produced from a cross-linkable polymer (e.g. butyl rubber). This variant provides high temperature resistance.

Figure 4:
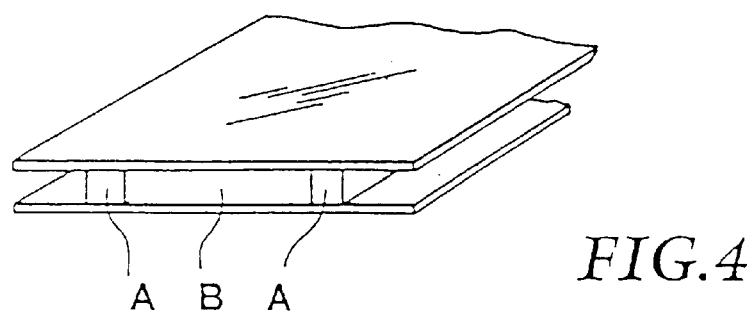
FIG. 4 shows a schematic, perspective representation of a further adherent tape.

Furthermore, in the embodiment shown in FIG. 4, the two outer narrow strips A consist of a cross-linkable polymer, e.g. butvl rubber, and the central, broader strip B consists of polyisobutylene containing a certain percentage of isoprene. According to one variant of this solution, the two narrow strips A can also consist of a mixture consisting, on the one hand, of polyisobutylene containing a certain percentage of isoprene and, on the other hand, of cross-linkable polymers, and strip B can consist of polyisobutylene containing a certain percentage of isoprene.

Thermo-shrinking material in the form of sheets or hoses is already known. Within the framework of the present invention, a sealing point is preferably sealed externally by pushing on a thermo-shrinking hose which has been radially extended and, if desired, cross-linked previously. The thermo-shrinking hose can be replaced by a sheet that has been pre-stretched in an appropriate manner and, if desired, cross-linked by radiation. In the course of a final heat treatment, which is carried out in the temperature range of from 60 to 80° C. within the framework of the present invention, the thermo-shrinking material re-shrinks towards the original dimensions, i.e. the dimensions which said material had prior to stretching. Due to said re-shrinking, the thermo-shrinking material closely encompasses the outer circumference of the bunched cable in the area of the sealing point.

The thermo-shrinking material can be processed with or without an internal coating. The internal coating can consist of a hot-melt adhesive. If a thermo-shrinking sheet in the form of a band is used instead of a thermo-shrinking hose, it is also possible to use a shrink band, which can be divided and, if necessary, re-closed, or a welded shrink band.

If the use of a shrinkable material is to be dispensed with, a jacket like outer envelope around the sealing point can be replaced by a wound band, a wound sheet, a rubber sleeve, a molded rubber part, such as a dividable rubber sleeve.

Thermo-shrinking hoses and sheets that can be used as an outer envelope within the framework of the present invention are described e.g. in DE 38 03 318 A1.

Strips of plastic material that can be used as outer envelopes for sealing points of wiring systems are described e.g. in German Utility Model G 93 12 731.6. These strips are provided with mechanical connection means at the edges thereof; said mechanical connection means can be brought into enclosing contact with an object to be enveloped. The strip of plastic material consists preferably of a shrinkable material so that, when the known strips have been put around an object and the mechanical connection means of said known strips have been closed, the strip of plastic material can be brought into enveloping contact with said object by shrinking.

Figure 5:
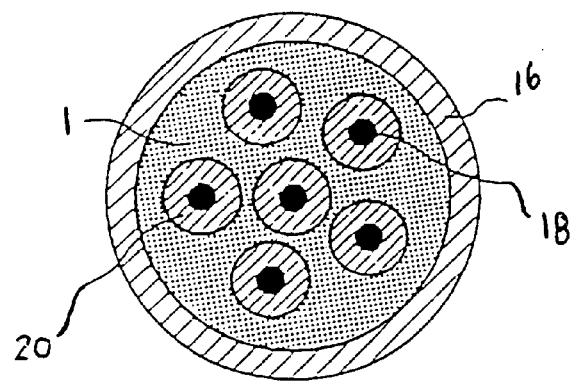
FIG. 5 shows a schematic cross-section through a sealing point with a plurality of conductors and lines, respectively, each of which is provided with an insulating cover, said plurality of conductors/ lines being embedded in a sealing compound in spaced relationship with one another. The outer envelope encompassing the sealing point is a shrinkable hose.

FIG. 5 schematically shows a section through a sealing point of a group of conductors 18, said sealing point being sealed with the aid of the adherent tape according to the present invention. Said figure shows an outer shrinking hose envelope 16 having a large number of individual conductors 18 in the interior thereof. In the embodiment shown, these conductors 18 are additionally provided with an insulative sheath 20. Between the conductors or rather between the insulative sheathes thereof, there is a sealing compound which is provided by the adhesive layer 1 according to one of FIGS. 1 to 4.

In the following, the processing of the adherent tape 10 (FIG. 7), i.e. the production of a longitudinal water seal is a bunched cable according to the present invention, will be described in detail.

Normally, cable harnesses are mounted on suitable mounting boards (nail board). In so doing, the individual conductors of a cable harness are laid by hand in accordance with a predetermined wiring diagram, the individual conductors having frequently different lengths. Since, the adhesive layer 1, preferably Butyl rubber, is sticky at room temperature, the conductors are kept in place when laid side-by-side. Thus, unlike Langen, Butyl rubber is used not only for temporarily keeping the conductors in place but also as the sole sealing material.

The sealing point of the cable harness, which is to be rendered longitudinally water-tight, is clearly defined.

Figure 6:
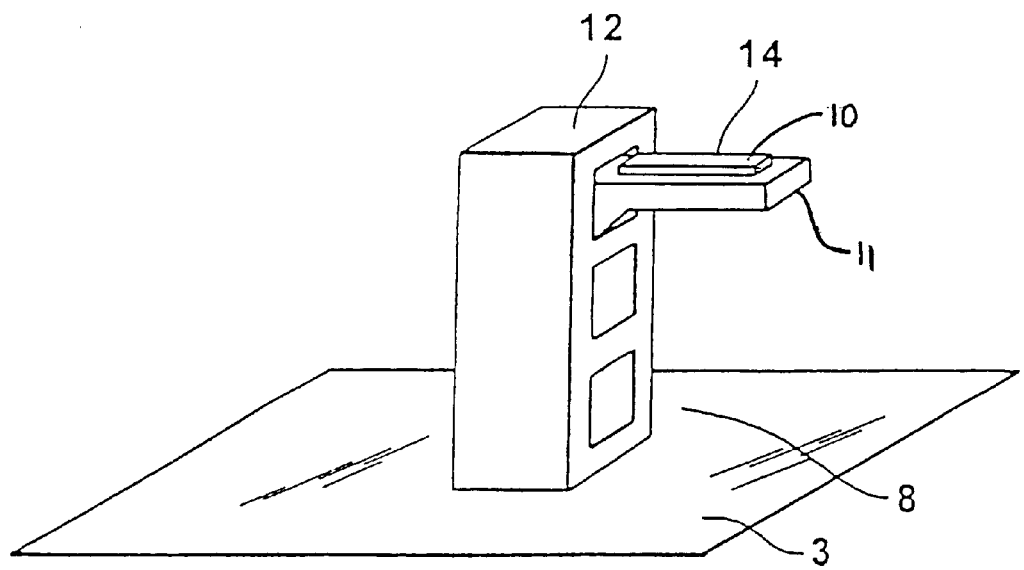
FIG. 6 shows a schematic perspective representation of an auxiliary device.

For processing the adherent tape 10, an auxiliary device, which is schematically shown in FIG. 6, is preferably used, said auxiliary device being attached to the mounting board in the area of the sealing point. It should here be emphasized that the cable harness which is to be rendered longitudinally water-tight may well comprise 80 individual conductors or more.

The auxiliary device 8 shown in FIG. 6 comprises a holding member 12 as well as a supporting member 11, the latter being adapted to be received in and arrested in said holding member 12. When the arresting means, which are not shown, have been released, the supporting member 11 can be removed from said holding member 12 of said device 8.

The supporting member 11 has formed therein a longitudinal groove 14. This longitudinally groove 14 has inserted therein a fixed length of the adherent tape 10, whereupon the upper cover layer 2 is stripped off said adherent tape. If no fixed lengths are used, a tape section from a supply roll can automatically be supplied, alternatively.

The extent to which the supporting member 11 is drawn out of the holding member 12, i.e. the free length of the supporting member 11 that can be seen in FIG. 6, depends on the respective cable harness to be mounted. The preferred length is dimensioned such that 8 to 15 individual conductors/lines can be accommodated on the extended supporting member 11 transversely to the longitudinal axis of the longitudinal groove 14, said longitudinal axis being not shown. The length of the adherent tape 10 inserted in said groove 14 is adapted to the number of individual conductors/lines.

Figure 7:
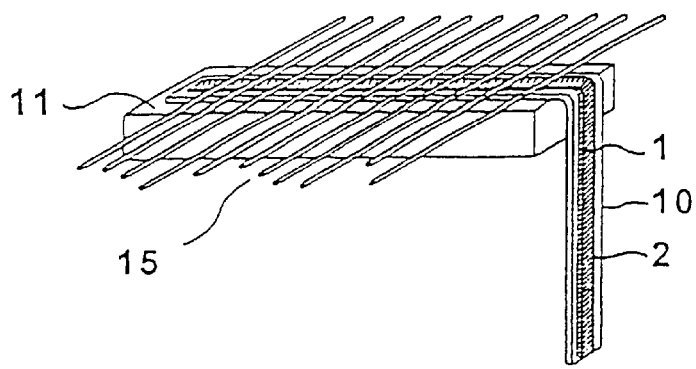
FIG. 7 shows a schematic representation of the use of the auxiliary device shown in FIG. 6.

FIG. 7 shows schematically the supporting member 11 of the auxiliary device 8, the adherent tape 10 being arranged in the non-visible longitudinal groove 14 of said supporting member 11. The lower cover layer 2 can be seen below the adhesive layer 1.

Transversely to the longitudinal direction of the supporting member 11, a layer 15 consisting of a plurality of individual conductors is shown schematically. The plurality of individual conductors shown is less than the total amount of individual conductors provided in the cable harness to be produced. The individual conductors, which are arranged in juxtaposition on the supporting member or rather on the adherent tape 10 resting on said supporting member, are designated by reference numeral 15 (FIG. 7). As can be seen in FIG. 7, the individual conductors forming the layer 15 are arranged in spaced, juxtaposed relationship on the adherent tape in such a way that they extend at right angles to the longitudinal axis of said tape.

When a first layer 15 has been filled with individual conductors, the projecting adherent tape 10, which hangs down from the free end of the supporting member 11 in FIG. 7 is folded onto said layer 15 and pressed onto the individual conductors forming said layer 15. It goes without saying that, in this situation, the individual conductors forming the layer 15 are adherently held in the adhesive mass 1 of the adhesive layer.

The supporting member 11 is then removed from the holding member 12 and the layer 15 enclosed by the adherent tape 10 on two sides thereof is forced downwards (FIG. 6) out of the area of the supporting member 11 so as to make room for the next layer of individual conductors/lines. The supporting member 11 is again inserted into and arrested in the holding member 12 in the manner shown in FIG. 5, whereupon a predetermined length of the adherent tape 10 is again inserted into the longitudinal groove 14 of the supporting member 11 and a next layer 15' of individual conductors/lines is pressed onto the adhesive layer 1 of the adherent tape 10 in the manner described. As has already been described with regard to the first layer 15, the section of tape 10 that hangs down (upper cover layer 2 no longer applied) is folded onto the layer so that also the second layer of individual conductors/lines is enclosed by the adherent material of layer 1 on both sides thereof.

Figure 8:
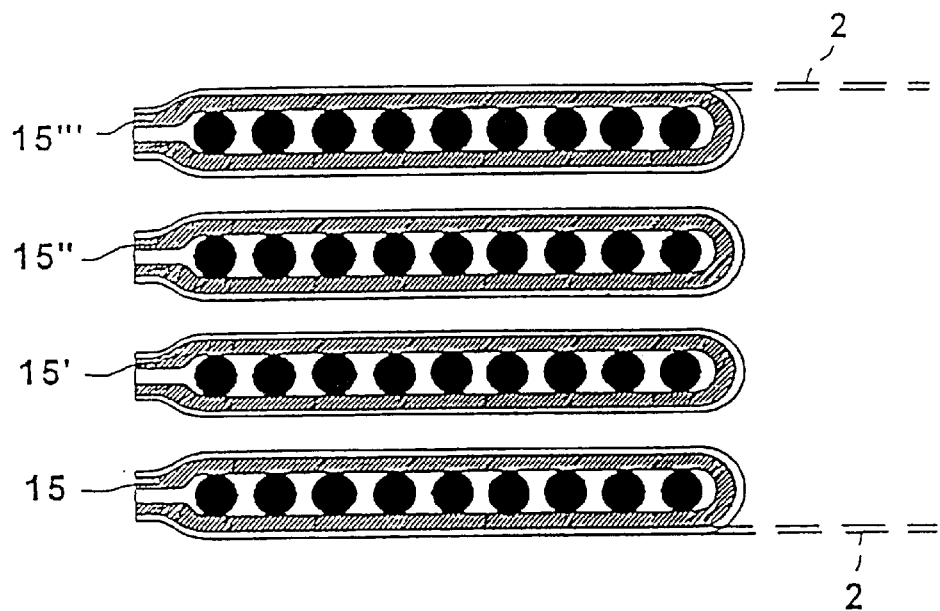
FIG. 8 shows a plurality of conductor layers encompassed by the sealing compound and produced with the aid of the auxiliary device according to FIGS. 6 and 7.

The separation, spreading and insertion of the individual conductors/lines described hereinbefore on the basis of two layers is continued until the whole number of individual conductors/lines forming the cable harness has been enveloped by the adherent tape 10 in the manner described. Some of these layers 15, 15', 15''', 15''', which have been produced in succession with the aid of the auxiliary device 8, are schematically shown in FIG. 8. As far as areas of the layers 15 to 15''' are in contact with one another in the arrangement according to FIG. 7, any kind of cover layer 2 has been removed. Only the lower cover layer 2 of the lowermost layer 15 as well as the upper cover layer 2 of the uppermost layer 15''' were not removed so that the package of layers formed by the above-mentioned layers can be handled without coming into contact with the adhesive materials.

The package of layers consisting of the above-mentioned layers has pressure applied thereto so that the adhesive materials (sealing compounds) of the individual layers are uniformly, i.e. integrally, cold welded or glued together. Following this, also the cover layers 2 which have not been removed previously (cf. FIG. 8) are removed.

Figure 9:
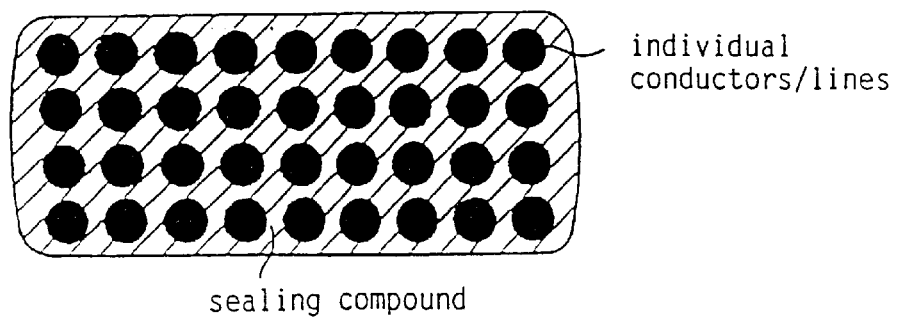
FIG. 9 shows a schematic representation of a plurality of conductors contained in a block of sealing compound.

FIG. 9 shows schematically the resultant condition, viz. a block of welded or glued sealing compound, which was originally arranged as an adhesive layer 1 in the adherent tape 10, with a plurality of individual conductors/lines distributed in said sealing compound in spaced relationship with one another. The sealing compound insulates the individual conductors/lines from one another.

Figure 10:
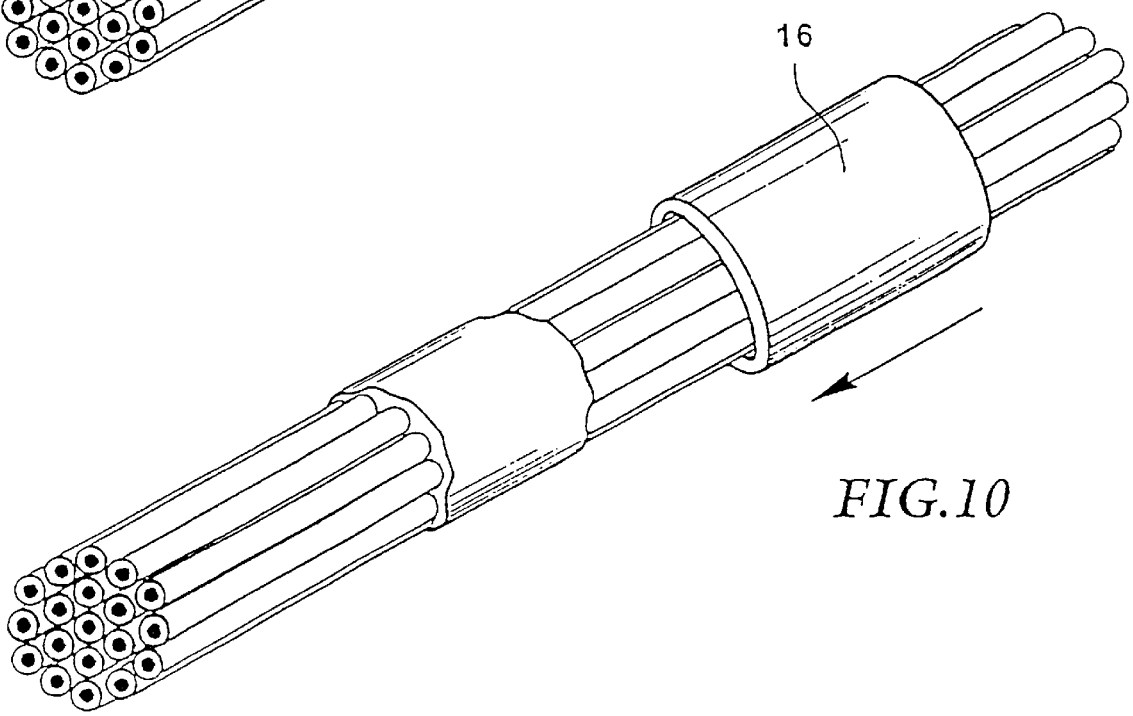
FIG. 10 shows in a schematic representation how the shrinkable hose is pushed onto a sealing point.

FIG. 10 shows schematically the plurality of individual conductors/lines projecting beyond the sealing material block, which is shown in FIG. 9, on both sides thereof. As is additionally illustrated in FIG. 10, a shrinkable hose 16 is pushed onto the block of sealing material in the direction of the arrow. This shrinkable hose 16 serves as an outer envelope of the sealing point formed by the sealing compound. When the shrinkable hose 16 has been pushed onto the sealing point, said shrinkable hose 16 is caused to reshrink closely around the sealing point of the bunched cable by supplying heat. The shrinkable hose preferably starts its shrinking at the softening temperature of the adhesive layer, for Butyl rubber, at approximately 60° C.

After the insulative conductors have been embedded into the Butyl rubber mass, as shown in FIGS. 7 and 8, and after the hose 16 has been provided, a heat treatment is effected at temperatures of from 60–70° C. (in the case of Butyl rubber) which causes shrinking of the outer hose and softening of the Butyl rubber sealing mass.

Figure 11:
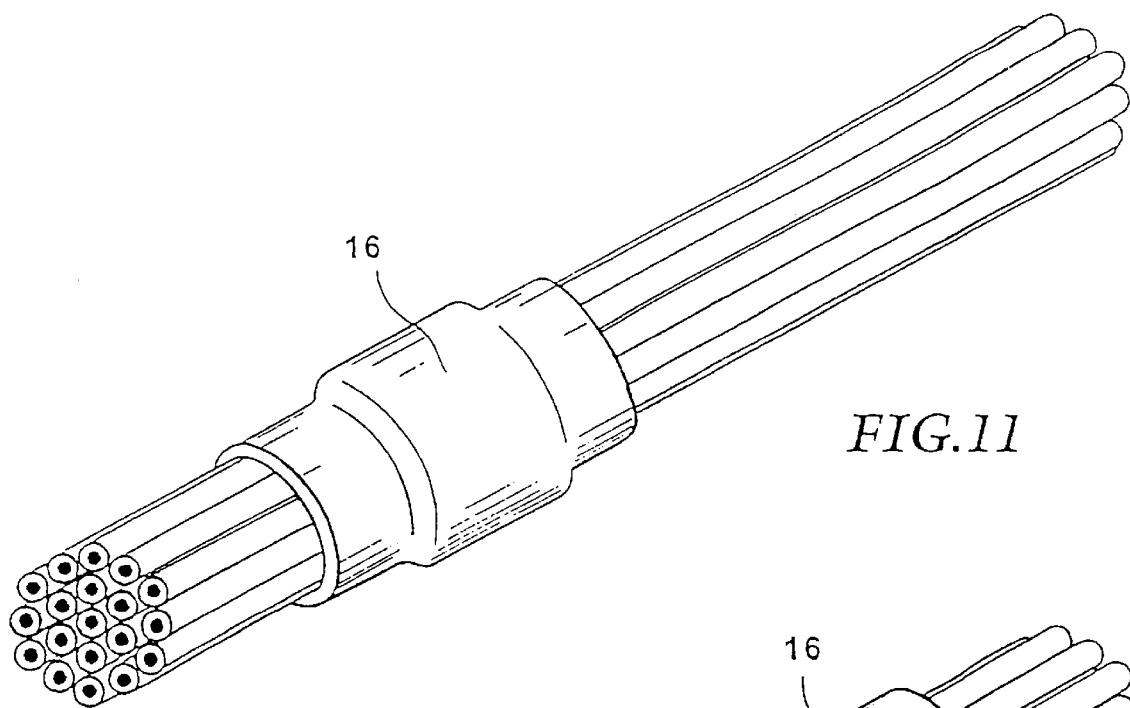
FIG. 11 shows a sealing point encompassed by an outer envelope.

FIG. 11 shows schematically the situation which exists after the shrinking of the hose 16 and in which the shrinkable hose 16 has been shrunk closely onto the outer circumference of the sealing point formed by the sealing compound that fills all spaces between the individual conductors as well as between the conductors and the interior surface of the shrinkable hose 16. When, in the situation shown in FIG. 11, moisture exists on the individual lines/conductors on the left-hand side of the sealing point, this water will be unable to pass the sealing point so that moisture existing in an area on the left-hand side of the sealing point cannot reach a bunched cable area on the right-hand side of the sealing point.

Irrespectively of the number of individual conductors in the bunched cable of the cable harness, the shrinking process will take approx. 15 to 30 s. The shrinking of the shrinkable hose 16 is carried out with the aid of hot-air devices (industrial dryers) which are known for this purpose.

If the material used for the outer envelope is not a shrinkable hose but one of the alternative materials referred to hereinbefore, these alternative materials are processed by means of commercially available devices.

By means of the preferably used shrinking-on of a shrinkable band as an outer envelope, the formation of a longitudinally water-tight section (sealing point) in a wiring system (wire harness), which is aimed at according to the present invention, is essentially finished.

For improving the quality of the longitudinal water tightness achieved, a final pressing step can additionally be carried out in an advantageous manner. In said pressing step, pressure is applied to the sealing point. This pressing step results in an increase of the sealing reliability, it can be carried out automatically together with the shrinking process-and it guarantees that a round cross sectional shape of the sealing point is achieved. In addition, superfluous sealing compound, which may possibly exist, can be squeezed out of the sealing point, i.e. removed from below the outer envelope by such a pressing operation, so that a reduction of the outer diameter of the sealing point can be achieved. Furthermore, a pressing operation can be used for impressing a mark or the like into the sealing point.

The pressing step which is exerted while the temperature of the sealing compound is such that it is in a softened state, can be of such pressure that any pores and voids within the sealing compound being compressed are closed. Air and other gases, which may be present within such voids and pores are also squeezed out. Such a pressing step preferably exerts a compressive force in the range of 300–340 N and is achieved with the aid of mechanical tools as shown in FIGS. 12–18. This compressive force is at least ten times greater than the compressive force exerted by the shrinking hose.

Figure 12:
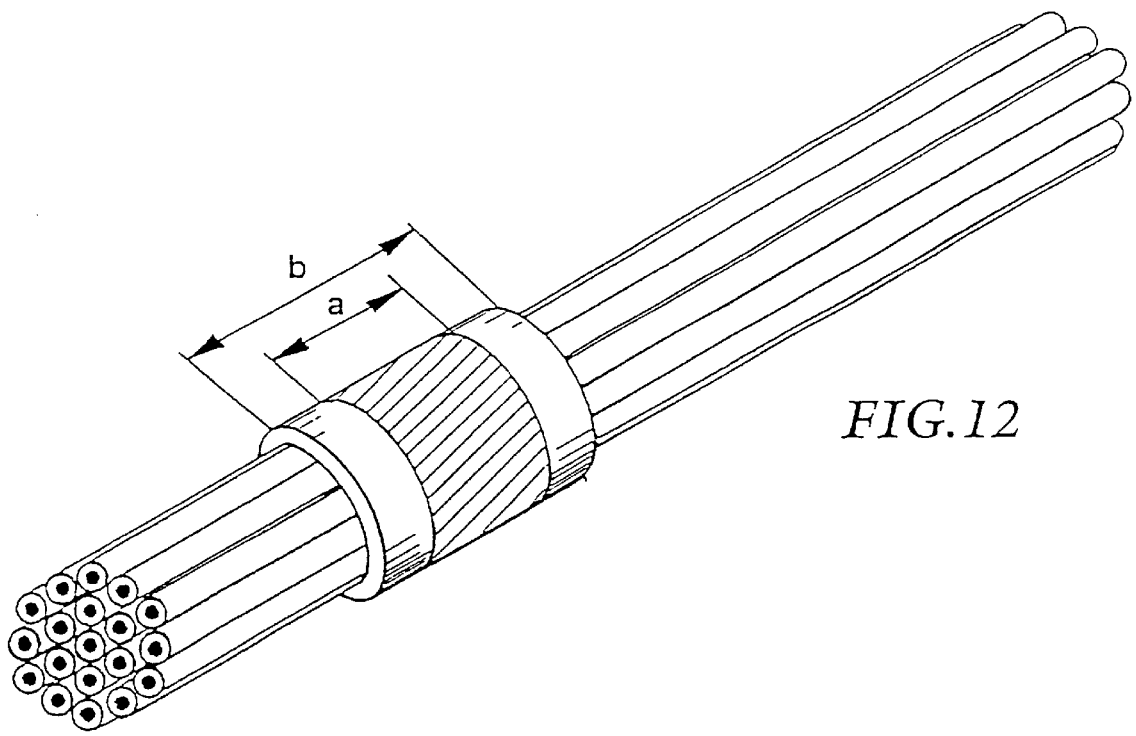
FIG. 12 shows a-schematic representation of a sealing point subjected to an additional pressing operation.

A sealing point that has been subjected to this final pressing step is shown in FIG. 12. In FIG. 12, distance a is the length of the sealing compound compressed in the cable harness, this length amounts to 20 to 30 mm. Furthermore, distance b is the length of the outer envelope (in the longitudinal direction of the cable harness) in FIG. 12. The outer-envelope preferably projects 5 to 10 mm beyond the sealing compound. In FIG. 12, the length of the envelope is preferably 30 to 50 mm.

In the above description, it has been assumed that the pressing operation was carried out only subsequent to the application of an outer envelope. Alternatively to such a course of action, it is, however, also possible to knead the sealing point, which is shown in FIG. 9, by hand prior to applying the outer envelope or to apply pressure to the sealing point according to FIG. 6 before the outer envelope is applied.

If the pressing operation were carried out in a predetermined die cavity, e.g. a predetermined die having a specific radius, it would be impossible to vary the diameter of the sealing point.

Hence, pressing devices of the type described herein below are preferred, since these devices can be adapted to various cable harness diameters without any necessity of changing the tools. The pressing devices described herein below and shown schematically in FIGS. 12 and 13 especially guarantee a circular cross-sectional shape of the sealing points after the pressing operation is achieved.

Figure 12A:
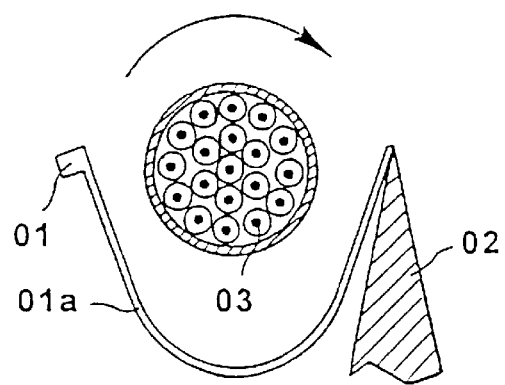
FIGS. 12a to 12c show schematic illustrations for the operation of a first pressing device.
Figure 12B:
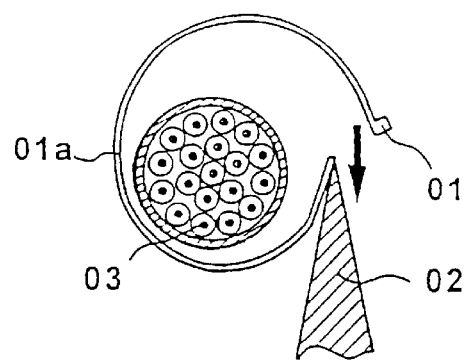
Figure 12C:
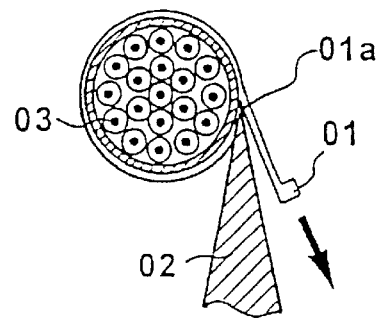

The pressing device which is schematically shown in FIGS. 12a to 12c comprises a holding wedge 02 having secured thereto a first end of a spring steel strip 01a. The other end of said spring steel strip 01a carries a handling means 01 for said spring steel strip. As can be seen in FIG. 12a, a previously produced longitudinally water-tight sealing point 03 is surrounded by said spring steel strip 01a, said spring steel strip having then applied thereto a tension force, as can be seen in FIG. 12b, until the spring steel strip 01a closely encompasses the sealing point 03 and compresses it. In view of the fact that the schematically shown pressing device applies-essentially the same pressure to the sealing point all side thereof, a substantially circular cross-sectional shape of said sealing point will be obtained.

Figure 13:
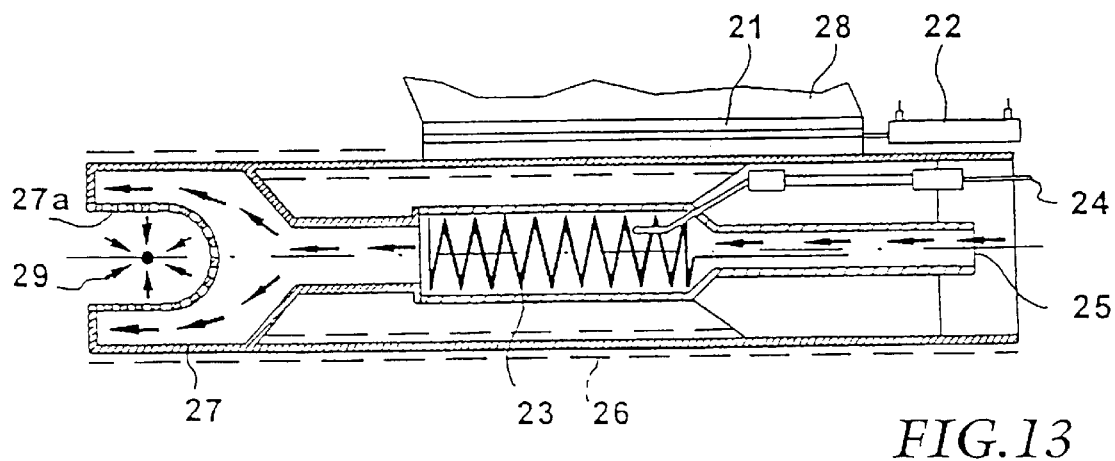
FIG. 13 shows a schematic representation of a shrinking device.
Figure 13A:
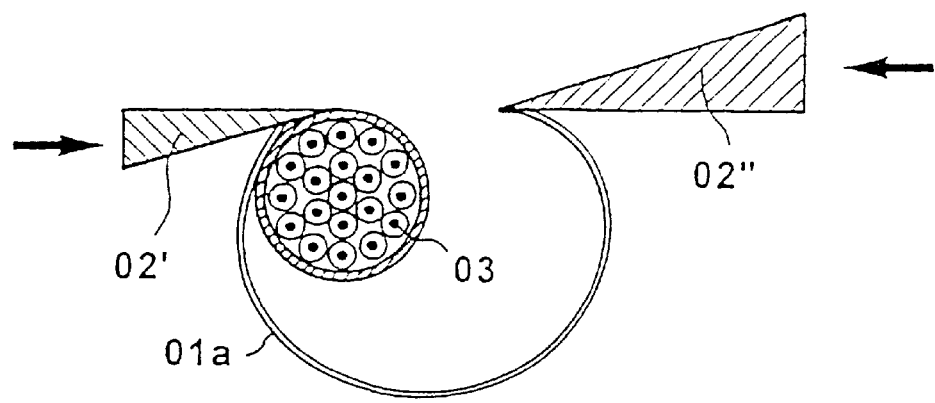
FIGS. 13a to 13c show schematic representations of the mode of operation of a second pressing device.
Figure 13B:
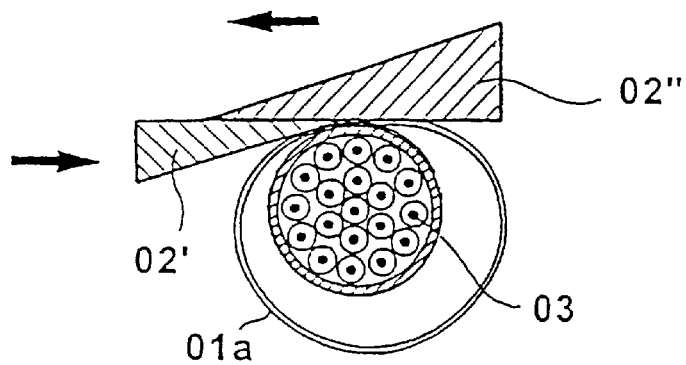
Figure 13C:
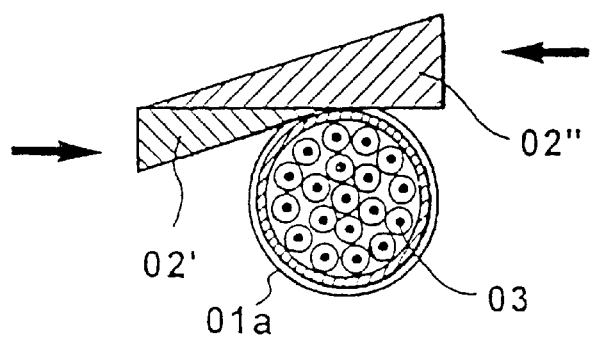

The second preferred pressing device described in FIGS. 13a to 13c differs from the first preferred pressing device according to FIGS. 12a to 12c essentially insofar as two holding wedges 02' and 02" are provided. A spring steel strip 01a has one of its ends connected to a holding wedge 02', whereas the other end thereof is connected to a holding wedge 02'. The two holding wedges 02' and 02" are adapted to be displaced relative to each other, the holding wedge 02' being essentially stationary, whereas the other holding wedge 02" is adapted to be displaced in the direction of the first-mentioned holding wedge 02'. When the sealing point 03 is arranged in the interior of the curved spring steel strip 01a, as can be seen in FIG. 13a, and when the holding wedge 02" is then displaced from the right to the left in the direction of the arrow, this will result in an increasingly close encompassing of the sealing point 03 by the spring steel strip 01a until the sealing point 03 is acted upon by said spring-steel-strip 01a on all sides thereof and is, consequently, deformed into a substantially circular cross sectional shape, as illustrated in FIGS. 13b and 13c.

Preferred embodiments of a shrinking device, a pressing device and a combined shrinking and pressing device will be described herein below on the basis of FIGS. 13 to 16.

FIG. 13 shows schematically a shrinking device with a carriage 21 capable of carrying out a motion of approximately 50 to 100 mm. A double-acting pneumatic cylinder 22 is provided as a driving source. A heating element 23, through which pressurized air flows, serves as a heat source. An electric terminal and a controlled thermosensor are designated by reference numeral 24. A pressurized-air port 25 is controlled with the aid of a pressure-reducing valve. A heat-protective sheet-26 serves the purpose of heat protection. The shrinking device additionally comprises a shrinking nozzle 27 having a substantially U-shaped cross-sectional shape. The surfaces of the U-shaped component which face each other have provided therein a large number of heat-discharge openings 27a from which hot air can be discharged. A carrier is designated by reference numeral 28, and reference numeral 29 schematically indicates the center of streams of hot air acting in the interior of the shrinking nozzle 27. The hot air produced in the interior of the U-shaped component of the shrinking nozzle 27 can be controlled with regard to temperature as well as with regard to the quantity of air.

Figure 13D:
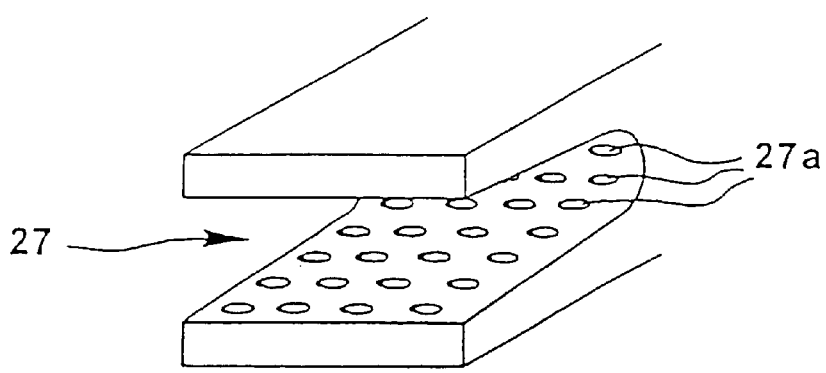
FIG. 13d shows a perspective representation of the shrinking nozzle of FIG. 13.
Figure 14:
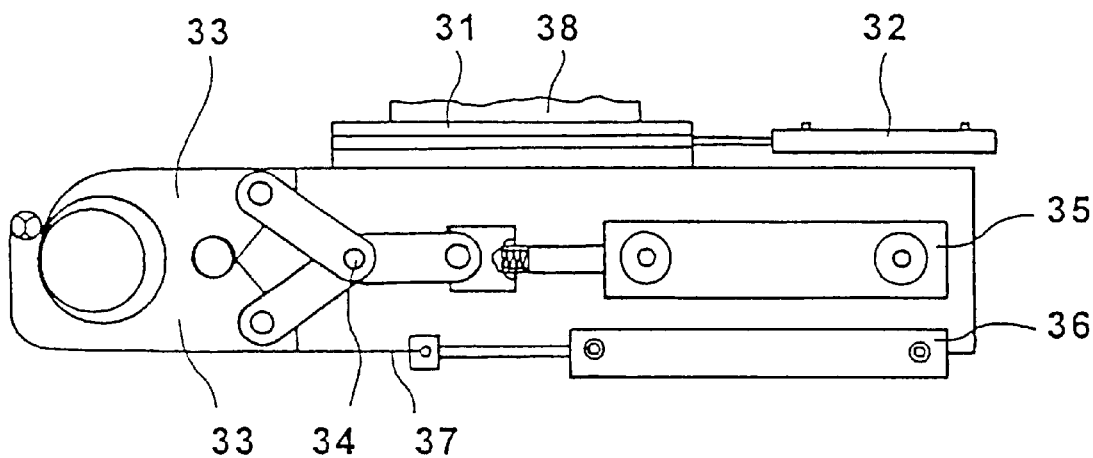
FIG. 14 shows a schematic representation of a pressing device.
Figure 14A:
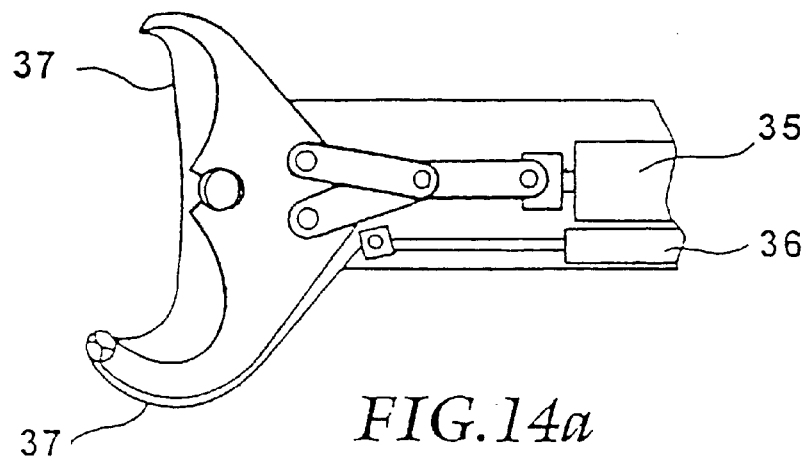
FIG. 14a shows a schematic representation of a detail of the pressing device shown in FIG. 14.

FIG. 13d shows schematically a perspective representation of the U-shaped component of the shrinking nozzle 27, some of the plurality of heat-discharge openings being designated by reference numeral 27a. The pressing device, which is shown schematically in FIG. 14 as well as FIG. 14a, comprises a carriage 31 which is adapted to be driven by a double-acting pneumatic cylinder 32 and which carries out a motion of approx. 50 to 100 mm. At one end of the device, tongs 33 are provided, which, with the aid of an articulated lever means 34, can be moved from a closed position to an open position and from said open position back to the closed position. For driving said tongs 33, a double-acting pneumatic cylinder 35 is provided, said cylinder 35 acting on the articulated lever means 34. A further double-acting pneumatic cylinder 36 is provided for actuating a spring steel strip 37 (cf. also FIGS. 12a and 13). The spring steel strip 37, which serves as a pressing strip, is arranged in the area of the opening of the tongs 33. As can be seen from FIGS. 14 and 14a, a piston rod end of the pneumatic cylinder 36 is connected to one end of the pressing strip 37. The other end of said pressing strip 37 is secured to one end of the tongs 33. By actuating the cylinder 36, the pressing strip 37 can be tightened and wound around a sealing point in the manner shown in FIG. 12, said sealing point being not shown in FIGS. 14 and 14a.

Figure 15:
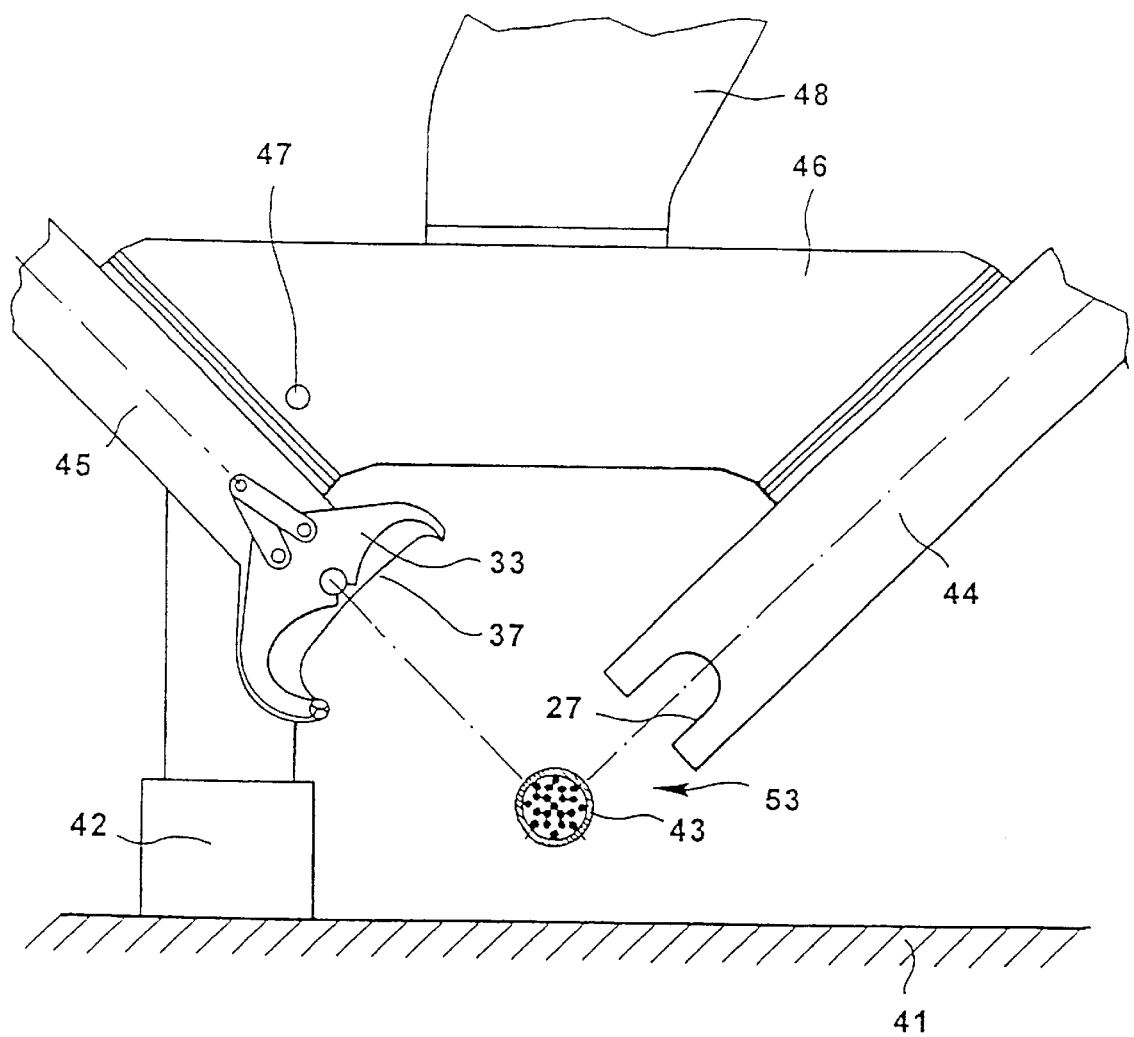
FIG. 15 shows a schematic representation of a combined shrinking and pressing device.
Figure 16:
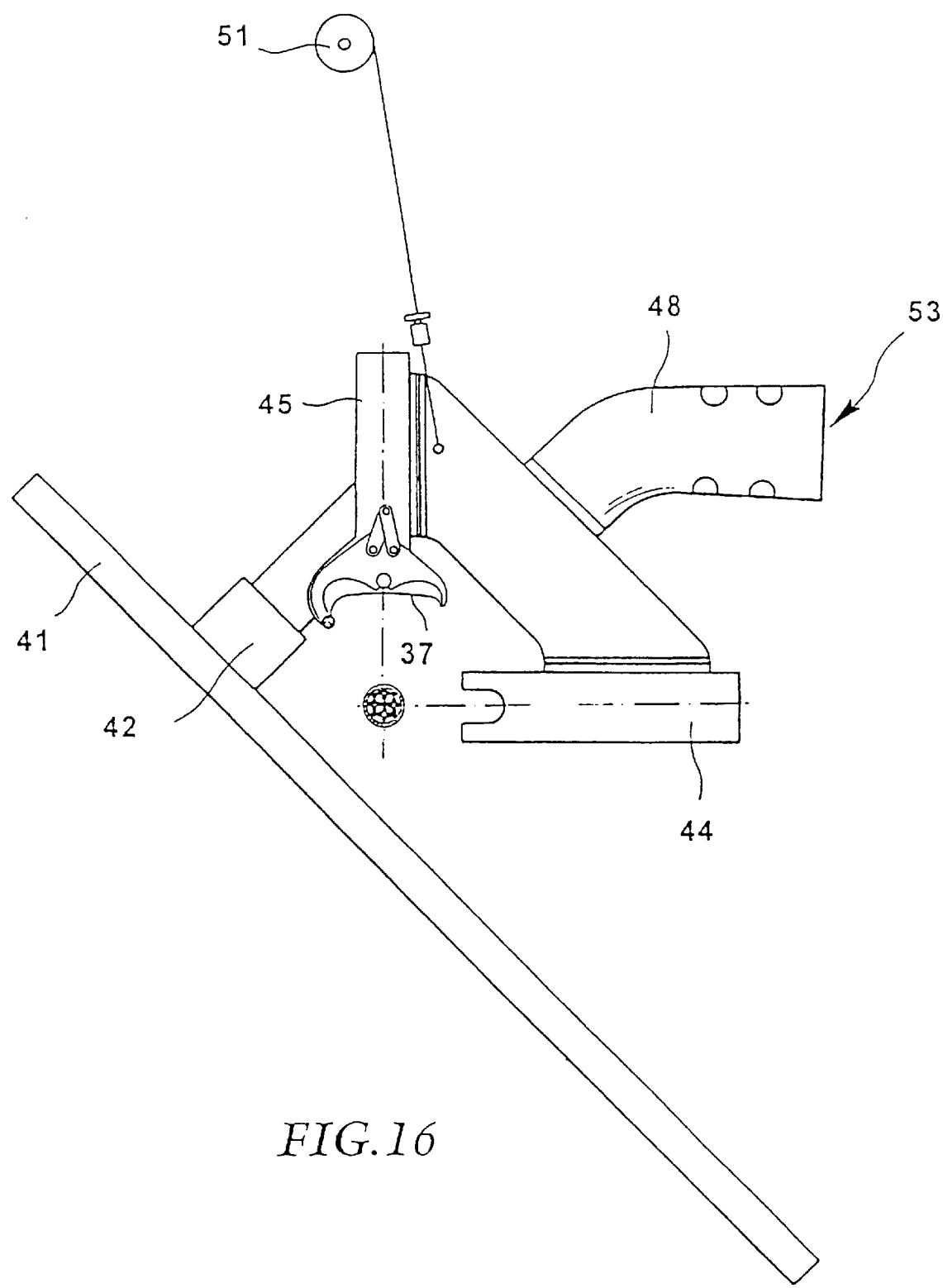
FIG. 16 shows a schematic representation of the structural design of a combined shrinking and pressing device in practice.

FIG. 15 schematically shows a combined shrinking/pressing device 53 according to the present invention. This combined device 53 is arranged on a mounting board 41 and it is provided with a docking station 42 with a support point. Reference numeral 43 designates the sealing point of a cable harness, and it can be seen that the longitudinal axes of a shrinking device 44 (cf. FIG. 13) and of a pressing device 45 (cf. FIG. 14) intersect at the center of said sealing point 43. Furthermore, a device carrying means 46 is displaceably supported on the pressing device 45. In the carrying means 46, a fastening point 47 is provided which is acted upon by a balanced cable means 51 (FIG. 16). Reference numeral 48 designates a handle provided on said carrying means 46.

As is schematically shown in FIG. 16, the combined device 53 is suspended from said balanced cable means 51. The mounting board 41 is provided with a docking station 42 for the combined device 53. At the point where the longitudinal axes of the shrinking device 44 and of the pressing device 45 intersect, the center of a sealing point 43 (cf. FIG. 15) is schematically shown.

When the sealing point has been prepared and finished in an appropriate manner, the combined shrinking/pressing device 53 is docked to the mounting board 41.

After the docking, the shrinking/pressing device 53 is started automatically, whereupon this combined device is displaced to its operating position. When a programmable process has taken place, the combined device 53 returns to its starting position. Following this, the programmed pressing operation starts; for this purpose, the pressing device 45 is advanced to its operating position, the tongs 33 close around the sealing point 43 and the pressing strip 37 is tightened into pressing contact with the sealing point. When the pressing operation has taken place, the combined device 53 returns to its starting position. The process control unit (not shown) reports by means of a signal the termination of the shrinking and pressing operation.

Figure 17:
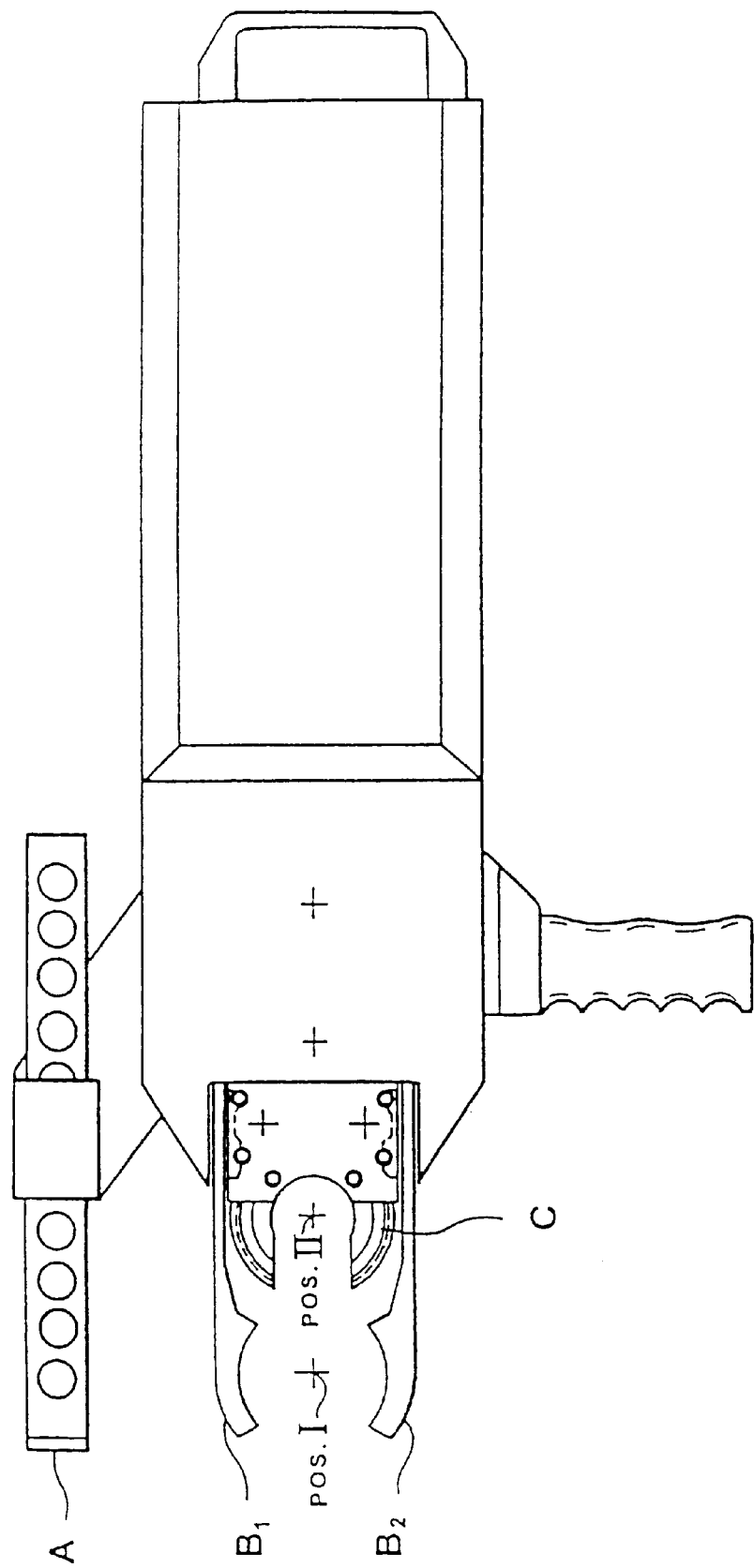
FIG. 17 shows a schematic representation of a second embodiment of a combined shrinking and pressing device for practical use.
Figure 18:
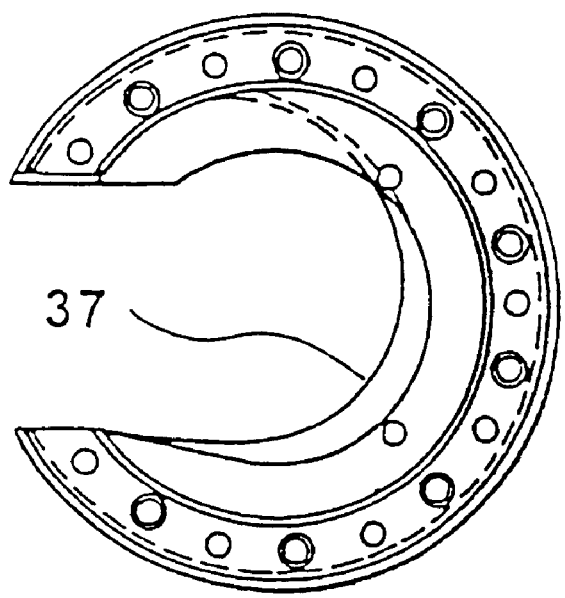
FIG. 18 shows a side view of the double-function head provided in the embodiment according to FIG. 17.

A preferred embodiment of the combined shrinking/pressing device is shown in FIGS. 17 and 18. This embodiment differs from the first embodiment according to FIG. 15 and 16 primarily with regard to the fact that the shrinking and pressing functions are united in a double-function head.

As can be seen from FIG. 17, the second embodiment is constructed such that it can be docked to a nail board (not shown) with the aid of a docking support A. In the double function head, hot-air blowers B, and B2 are arranged in opposed relationship and, in addition, a pressing device c is accommodated in said head. As can be seen in FIG. 18, the pressing device c is provided with a tightening strip corresponding to the tightening strip 37 in FIG. 15 and 16.

The mode of operation of the embodiment provided with the double function head is as follows:

1. The device is docked to a nail board, not shown, with the aid of the docking support A. This has the effect that the hot air blowers B, and B2 are activated so that a shrinkable hose inserted between these two hot-air blowers is shrunk onto the circumference of the bunch of conductors enclosed by said shrinkable hose within approximately 30 to 30 seconds. During this shrinking process, the device occupies position I, which is shown in FIG. 17.
2. Following this, the device moves automatically forward to position II, which is shown in FIG. 17, so that the bunch of conductors onto which the hose has been shrunk is positioned in the pressing device C. In said pressing device C, the bunch of conductors and the hose which has been shrunk onto said conductors are encompassed by the tightening strip 37 shown in FIG. 18 and compressed for a period of about 30 seconds. The processes of shrinking and pressing have been described hereinbefore in detail.
3. Following this, the device automatically returns to position I; in the course of this return movement, additional heating can be carried out with the aid of the two hot-air blowers if further smoothing of the surface of the shrinkable hose should be necessary.

The hot-air blowers function according to the principle shown in FIG. 13. The hot-air blowers $B_1$ and $B_2$ are, however, not implemented as a U-shaped nozzle supplied by one heating element. In the preferred embodiment according to FIGS. 17 and 18 two heating elements are provided, which supply separately from one another the upper hot-air blower $B_1$ and the lower hot-air blower $B_2$.

The preferred embodiment according to FIGS. 17 and 18 is based on the principle illustrated in FIGS. 12A, 12B, 12C, 13A, 13B and 13C of the application documents.

The time required for forming a sealing point can be reduced drastically with the aid of the present invention. With the conventional methods of the prior art, it is hardly possible to reduce the time required for forming a sealing point and for the final application of a shrinkable hose to less than approx. 15 minutes, whereas, thanks to the present invention, it takes one minute at the most to render a predetermined section of a multi-conductor cable harness longitudinally water-tight.

The automatic production of a sealing point in a multi-conductor wiring system, which is possible with the aid of the present invention, can be alternatively carried out by means of a robot.

Due to the inventive method of the present invention the strict requirements of the European Automobile manufacturers discussed above is met. While a large degree of the success of the methods of the present invention are achieved by the mechanical pressing and compacting steps, the overwhelming effect of the inventive method is achieved by using a sealing compound, such as Butyl rubber which has good adhesive properties at ambient temperatures and which softens at temperatures which will not damage the insulative sheaths of the individual conductors of the conductor bundle.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for forming a longitudinally water-tight section in a predetermined area of a multi-conductor wiring system, the multi-conductor wiring system having a plurality of individual conductors, each individual conductor being encased in an insulative sheath, the method comprising the steps of:

providing an adherent tape having a single sealing compound for adhering the individual conductors thereto and for sealing spaces between the individual conductors when exposed to a softening temperature less than the softening temperature of the insulative sheathes of the individual conductors, wherein the sealing compound is Butyl rubber in which the individual conductors adhere at room temperature and said Butyl rubber having a softening temperature of approximately 60° C.;

arranging the individual conductors parallel to one another in a direction transverse to the adherent tape in the predetermined area on a first end of the adherent tape;

folding a second end of said adherent tape onto the conductors such that the individual conductors are sandwiched therebetween;

pressing the first and second ends of the adherent tape together to sealingly fill the spaces between the conductors;

applying an outer envelope over the sealed predetermined area; and compressing the sealing compound and the outer envelope at an elevated pressure while said sealing compound is heated to the softening temperature such that voids, pores, and gases in the sealing compound are substantially removed.

2. The method according to claim 1, wherein the outer envelope is a shrinkable hose which shrinks when heated to a shrinking temperature.

3. The method according to claim 2, wherein the shrinking temperature of the shrinkable hose is approximately the same as the softening temperature of the sealing compound.

4. The method according to claim 1, wherein the multi-conductor wiring system is a cable harness.

5. The method according to claim 1, wherein the elevated pressure is in the range of 300–340 N.

6. The method according to claim 1, wherein the sealing compound further having conductive filaments contained therein and wherein the heating step comprises passing a current through the conductive filaments for causing an increase in temperature of the conductive filaments and the sealing compound in contact therewith.

7. The method according to claim 1, wherein the plurality of individual conductors are divided into sub-groups, the arranging and folding steps being performed for each sub-group, and wherein the pressing step further presses the sub-groups folded in the adherent tape together.

* * * * *